(12) United States Patent
Eidloth

(10) Patent No.: US 6,322,466 B1
(45) Date of Patent: Nov. 27, 2001

(54) CONTINUOUSLY VARIABLE CHAIN-BELT TRANSMISSION

(75) Inventor: Rainer Eidloth, Bamberg (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/460,893

(22) Filed: Dec. 14, 1999

(30) Foreign Application Priority Data

Dec. 16, 1998 (DE) .............................. 198 58 040

(51) Int. Cl.[7] .................................. F16H 55/56
(52) U.S. Cl. .................................. 474/8; 474/18
(58) Field of Search ............... 474/70, 38, 46, 474/44, 30, 18, 28, 8

(56) References Cited

U.S. PATENT DOCUMENTS 6,123,634 * 9/2000 Faust et al. ....................... 474/8

FOREIGN PATENT DOCUMENTS

| 197 43 675 A | | | |
|---|---|---|---|
| 1 | | 4/1998 | (DE) . |
| 19958073-A1 | * | 6/2000 | (DE) . |
| 59040061-A | * | 3/1984 | (JP) . |
| 02173447-A | * | 7/1990 | (JP) . |

* cited by examiner

Primary Examiner—Dirk Wright
(74) Attorney, Agent, or Firm—Darby & Darby

(57) ABSTRACT

A continuously variable chain-belt transmission has two cone-disk pulleys (pairs of conical disks) (4, 5), a chain belt (2) as well as a noise-damping device (23) for damping the noise generated by the chain-belt running over the cone-disk pulleys. The noise-damping device is arranged at the bearings of the conical disks (4, 5) and prevents sound waves from being transmitted through material portions of the transmission from the conical disks to adjacent parts.

14 Claims, 3 Drawing Sheets

CONTINUOUSLY VARIABLE CHAIN-BELT TRANSMISSION

BACKGROUND OF THE INVENTION

The invention relates to a continuously variable chain-belt transmission with cone-disk pulleys (pairs of conical disks) both at the torque-input side and at the torque-output side, an endless flexible torque-transmitting device (often referred to as a chain belt) as well as a device for damping audible noise that occurs as a side effect of transmitting a torque through the chain-belt transmission.

Several different versions within the category of chain-belt transmissions with conical disks are already known. The endless flexible torque-transmitting devices that are used to transmit a torque from the pair of conical disks at the torque-input side to the pair of conical disks at the torque-output side are, for example, link chains or bands of shear-stressed members that run on the conical disks. The link chains employed for this purpose include force-transfer elements with lateral end surfaces that are in frictional contact with the conical disks, thereby transmitting a torque from the pair of conical disks at the input side through the link chain to the pair of conical disks at the output side.

In an arrangement of this kind, the contact between the pairs of conical disks and the force-transfer elements occurs along a polygonal line, because the individual force-transfer elements are spaced apart from each other along the running direction of the chain. As the link chain runs around the pairs of conical disks, the end surfaces of the force transfer elements one after another enter into contact with the conical disks so that the continuous sequence of impacts of the force-transfer elements against the conical disks produces an acoustical resonance in the conical disks.

Given that each of the pairs of conical disks is arranged on a shaft that serves to transmit the torque, the sonic vibrations are propagated through the shafts, their bearings and the transmission housing to the outside and in the end also to the interior of any vehicle equipped with the known state-of-the-art chain-belt transmission.

To attenuate this kind of transmission noise, secondary measures have been employed until now, which included isolating the transmission housing or the chassis tunnel through coated housing components or isolating floor mats.

Another noise-damping measure, known from DE 197 43 675 A1, consists of shell-like elements arranged at the support areas of the conical disks where the space between the shell-like elements and the conical disks is occupied by a pressure fluid, e.g., by the existing oil that is used in the transmission. The concept of this known transmission also provides for a damping layer, e.g., in the form of a polymer layer between the shell-like element and the conical disk. Thus, the aforementioned known transmission represents an attempt to reduce the generation of noise by lessening the impulse transmitted by the link chain as it enters into contact with the conical disks.

OBJECT OF THE INVENTION

Departing from the known state of the art, the object of the present invention is to further develop the chain-belt transmission so that the noise from the impulses transmitted between the link chain and the pairs of conical disks is prevented from reaching the surrounding areas or that the sound propagation through the solid parts is at least significantly reduced.

SUMMARY OF THE INVENTION

To meet this objective, the invention provides a continuously variable chain-belt transmission with cone-disk pulleys (pairs of conical disks) both at the torque-input side and at the torque-output side, an endless flexible torque-transmitting device (often referred to as a chain belt) as well as a device for damping audible noise that occurs as a side effect of transmitting a torque through the chain-belt transmission, where the noise-damping device is arranged in the area of the bearings of at least one of the conical disks. In other words, a noise-damping device is provided in the places where the conical disks are supported in the chain-belt transmission, such as, e.g., an input shaft and/or an output shaft, the housing of the chain-belt transmission or at other contact interfaces between the conical disks and the other parts of the chain-belt transmission.

Arranging the noise-damping device at the bearings provides an acoustical isolation of the conical disks against the parts adjacent to the bearings and thus against all surrounding areas. This concept of active noise elimination prevents the sonic body vibrations caused by the impact of the force-transfer elements on the conical disks from reaching the surrounding area outside of the conical disks or at least significantly reduces the sound propagation through the solid body parts of the structure. According to the invention, the noise-damping device is arranged in the areas of the bearings of axially movable as well as axially fixed conical disks. The noise-damping device in the area of the bearings of the conical disks can be configured as a ring-shaped part of essentially U-shaped cross-section with a seating recess for a damper insert. The term "damper insert" is meant to cover any kind of material or any pair or combination of materials that will in each individual case have the effect of blocking or at least significantly reducing the sound propagation from the conical disks and their bearings to the surrounding structural parts.

According to a more advanced embodiment of the invention, the noise-damping device can be configured as a ring-shaped part of essentially U-shaped cross-section with a seating recess for a damper insert, in which the legs of the U-shaped cross-section have end portions that are angled towards the inside of the U, thus reaching at least partially around the damper insert that is positioned in the seating recess. This arrangement of containing the damper insert in the seating recess of the ring-shaped part provides a particularly high degree of compressive strength so that the rigidity of the conical disks is not affected in a negative way.

It can also be advantageous for the noise-damping device to be configured as a ring-shaped element with an essentially U-shaped cross-section that is open at one axial end and a seating recess for the damper insert. This configuration has the advantage that the damper insert can simply be pushed into the seating recess of the ring-shaped element, which meets the requirement for a simple assembly process.

The aforementioned damper insert can be configured as a single piece of material or it can have a layered structure. In other words, the damper insert can be made of a homogeneous material or as a sandwich structure of several layers which, e.g., could also consist of different materials in order to provide a damper insert capable of damping different input vibration spectra. Possible choices are that the sandwich structure has layers stacked radially from the inner to the outer radius of the ring-shaped element, or that the layers follow each other axially along the lengthwise direction of the ring-shaped element. It is also possible that the sandwich structure is layered both in the radial and axial direction.

According to the invention, the damper insert can be formed, e.g., of an elastomeric material and/or a rubber material and/or a metallic material (e.g., certain alloys)

and/or a foam of the aforementioned materials. The choice of a foam for the damper insert has the advantage that it provides an easy installation process for the damper insert, especially in the case where the ring-shaped element has inward-angled legs, by simply injecting a foam of the aforementioned materials into the seating recess.

In accordance with the invention, the damper insert protrudes above the top level of the seating recess by a predetermined height gap so that, with the conical disk seated on the damper insert, there is no direct material contact between the preferably metallic conical disk and the disk bearings that are made of metal alloys.

With a movable conical disk, the arrangement can be such that the ring-shaped element has a damper insert consisting, e.g., of a foam material, positioned in the seating recess and the conical disk is seated on the damper insert. A fixed conical disk can have an arrangement where the damper insert protrudes above the top level of the seating recess by a predetermined height gap and the conical disk is supported by the bearings through the damper insert. In other words, a ring-shaped element made of a metallic material has a metal-to-metal material contact with the conical disk and is seated by way of the damper insert on a bearing, e.g., a roller bearing, in the housing of the chain-belt transmission, without any metal-to-metal contact existing between the ring-shaped element and the roller bearing of the fixed conical disk.

Thus, the invention provides a chain-belt transmission in which the conical disks are acoustically isolated from their environment. The isolation prevents or at least largely reduces the propagation of body vibrations from the conical disks to the adjacent parts. The noise-damping device comprising an insert of a damping material can be arranged at all places where body vibrations are transmitted from the conical disks to the adjacent parts of the transmission. To provide an adequate degree of stiffness in the conical disks, it is possible to vary the aforementioned height gap. The damping insert can have the shape of a ring that completely fills out the ring-shaped seating recess, or the insert can be arranged in segment form in the ring-shaped seating recess, e.g., configured as a plurality of strip-shaped inserts on which the conical disks are seated or through which the conical disks are supported in relation to their environment. The damping material for the damper insert can be a polymer material or a rubber material, a metallic material or metal alloys, and it is also possible to use combinations of the aforementioned materials and arrange them in layers in a sandwich configuration. It is also possible to inject the said materials or material combinations into the seating recess as a foam, so that the conical disks rest on a foam cushion or are acoustically isolated from their environment by a foam cushion.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The invention is explained below with details referenced against the attached drawing, where.

DETAILED DESCRIPTION OF THE INVENTION

Figure 1:
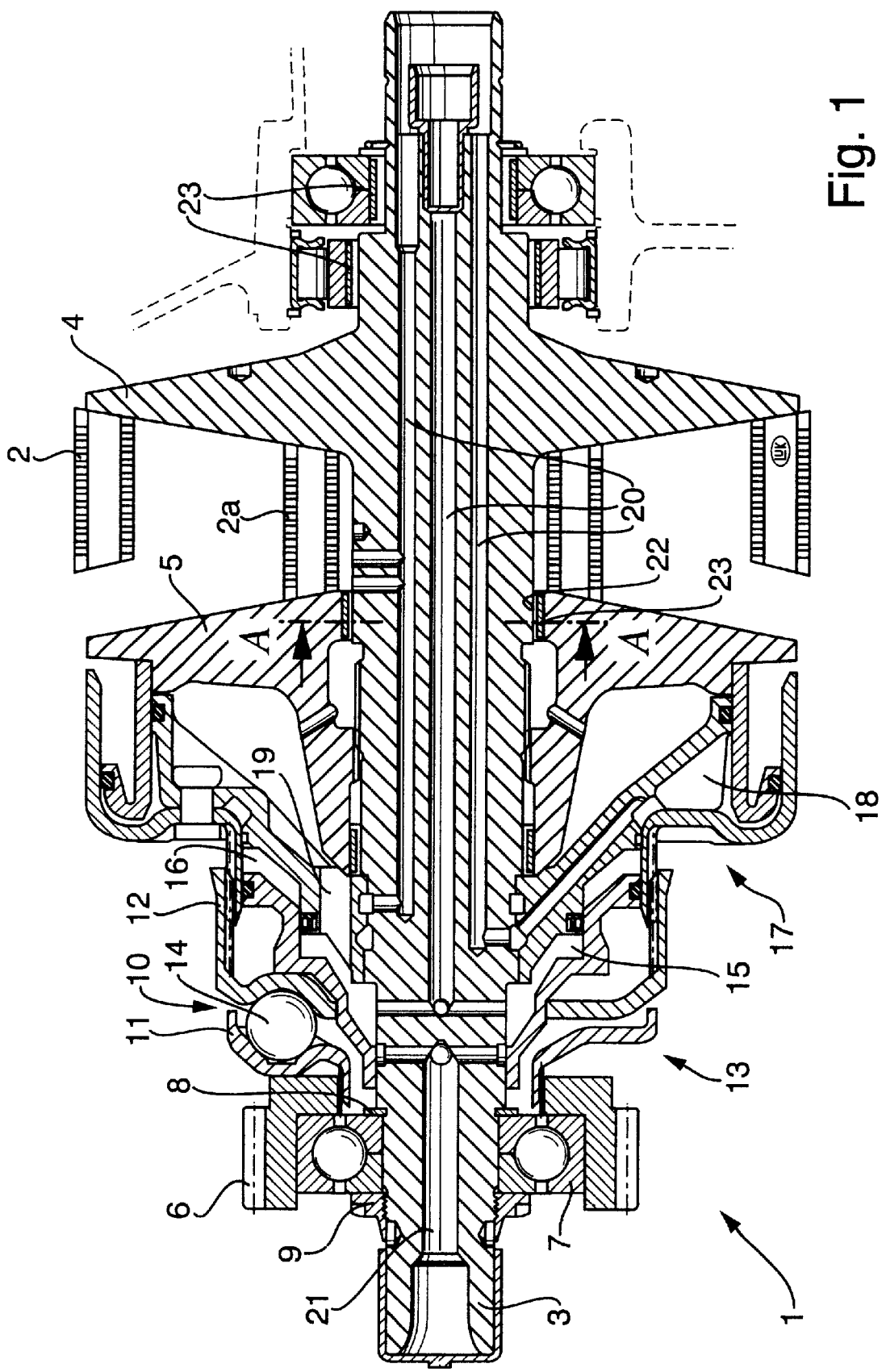
FIG. 1 represents the input half of a chain-belt transmission according to the invention with the damper-equipped bearings of the pair of conical disks.

As already mentioned, FIG. 1 shows only part of a chain-belt transmission with cone pulleys , i.e., the driven part or input part of the chain-belt transmission 1, which is driven by a prime mover such as a combustion engine.

In a complete chain-belt transmission, the input part is complemented by a driving part or output part of the continuously variable chain-belt transmission in a combined arrangement where the two parts are connected by an endless flexible torque-transmitting device, for example in the form of a link chain 2.

On the input side, the chain-belt transmission 1 has a shaft 3 which, in the illustrated embodiment, is formed as a monolithic unit out of one piece with the fixed conical disk 4.

In the lengthwise or axial direction of the shaft 3, the axially fixed conical disk 4 faces towards an adjacent axially movable conical disk 5.

FIG. 1 indicates a radially outer position of the link chain 2 between the pair of conical disks 4, 5 on the input side of the transmission. The link chain 2 will take this radially outer position, if the axially movable conical disk 5 is moved to the right (in relation to the drawing). Sliding the movable conical disk 5 to the right will push the link chain 2 to a position of greater radius whereby the transmission ratio is changed to a speed-magnifying mode.

The axially movable conical disk 5 can also be shifted to the left (in relation to the drawing), causing the link chain 2 to take the position 2a at a smaller radius whereby the transmission ratio of the chain-belt transmission 1 is changed to a speed-reducing mode.

The torque supplied by a prime mover unit (not shown) is introduced to the input part (shown in FIG. 1) of the chain-belt transmission by way of a gear 6. The latter is mounted on the shaft 3 by means of a ball-bearing 7 that is designed to take up axial as well as radial forces and is fastened on the shaft between a disk 8 and a shaft nut 9. Arranged between the gear 6 and the axially movable conical disk 5 is a torque sensor 10 comprising a ramp disk configuration 13 with an axially fixed ramp disk 11 and an axially movable ramp disk 12. Roller bodies, for example spherical balls 14 as shown in the drawing, are arranged between the ramp disks 11, 12.

Introducing a torque through the gear 6 causes a rotational displacement of the axially fixed ramp disk 11 and the axially movable ramp disk 12 in relation to each other. The relative rotation between the ramp disks, in turn, causes an axial displacement of the ramp disk 12 as the balls 14 run up the ramps and thereby effect an axial displacement of the ramp disks in relation to each other.

The torque sensor 10 has two pressure chambers 15, 16, where the medium in the first chamber 15 is pressurized in function of the magnitude of the input torque and the pressure-medium supply of the second chamber 16 depends on the transmission ratio.

To generate the contact pressure on the link chain 2 between the axially fixed conical disk 4 and the axially movable conical disk 5, there is a piston/cylinder unit 17 with two pressure chambers 18, 19. The first pressure chamber 18 in connection with the torque-controlled pressure chamber 15 of the torque sensor 10 serves to increase or decrease the contact pressure force acting on the link chain between the conical disks 4, 5, and the second pressure chamber 19 serves to vary the contact pressure force depending on the transmission ratio.

The shaft 3 has three conduits 20 through which the pressure chambers are supplied with pressure medium by a pump (not shown). The pressure medium can exit from the shaft 3 through an outlet conduit 21 and can subsequently be returned to the hydraulic circuit.

The pressurization of the pressure chambers 15, 16, 18, 19 causes a torque-dependent and transmission ratio-dependent displacement of the axially movable conical disk 5 on the shaft 3. The axially movable conical disk 5 is received on the shaft 3 through centering surfaces 22 that provide a sliding seat for the movable conical disk 5. As can easily be seen from FIG. 1, the chain-belt transmission 1 has noise-damping devices 23 in the area of the bearings that support the conical disk 5 on the shaft 3. As shown in closer detail in FIG. 2, each of the noise-damping devices 23 is configured as a ring-shaped element 24 with a damper insert 25.

Figure 2:
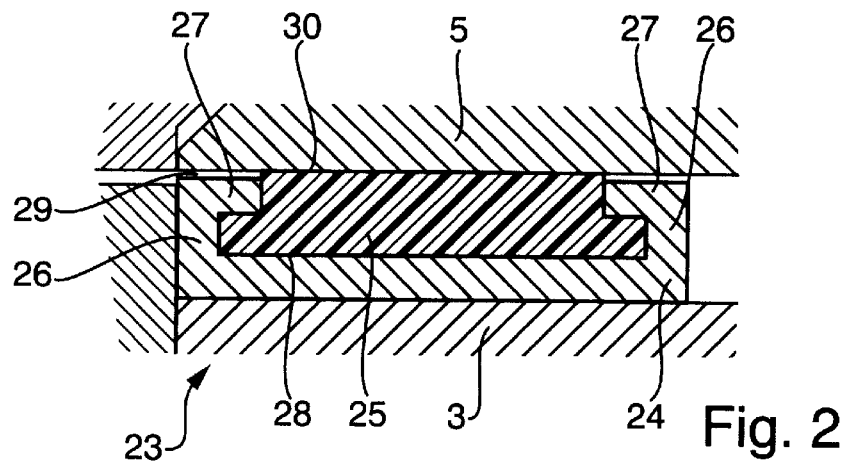
FIG. 2 represents an enlarged sectional view of a ring-shaped element in which a damper insert is arranged in accordance with a first embodiment of the invention.

In accordance with a first embodiment of the noise-damping device 23 as illustrated in FIG. 2, the ring-shaped element 24 has a U-shaped cross-section in which the legs 26 of the U have inward-angled end portions 27 reaching part of the way around the topside of the damper insert 25 and thereby holding the damper insert fixed in place. The ring-shaped element 24 is seated on the shaft 3 with a fit allowing axial movement and has a channel-shaped recess 28 holding the damper insert 25.

The conical disk 5 rests on the top surface of the damper insert 25, leaving a gap 29 between the inward-angled end portions 27 and the axially movable conical disk 5. Due to the gap 29, there is no metal-to-metal contact between the seating surface 30 of the axially movable conical disk and the ring-shaped element 24, as the support of the conical disk 5 on the ring-shaped element 24 occurs only by way of the damper insert 25.

The damper insert 25 can be made, e.g., of a foam of an elastomeric material and/or a rubber material and/or a metallic material or a metallic alloy, and the ring-shaped element 24 with the damper insert 25 can, for example, be press-fitted into the annular seating surface 30 of the conical disk 5.

Now, when a torque is transmitted from the engine to the drive train of a motor vehicle by way of the link chain between the pair of conical disks 4, 5 on the input side and the pair of conical disks on the output side (not shown), the link chain 2 will enter the space between the conical disks 4, 5 and come into contact with the running surfaces 31, 32 of the conical disks 4, 5. As each individual force-transfer element of the link chain 2 meets the running surfaces, the continuous sequence of impacts generates sonic vibrations in the conical disks 4, 5. This sonic resonance manifests itself on the outside as an emission of sound that, for example, the driver of the vehicle that is equipped with the transmission will be able to hear.

In addition to the arrangement of the noise-damping device 23 at the bearings of the axially movable conical disk 5, the axially fixed disk 4, too, is provided with a noise-damping device 23 at its bearing. In the transmission input portion shown in FIG. 1, the shaft 3, too, is equipped with a noise-damping device 23 on its right half (in relation to the drawing). In this case, the noise-damping device 23 is configured as a ring-shaped element 24 with a damper insert 25 by which the shaft 3 is supported at the inner ring of a roller bearing 33.

Although FIG. 1 shows only the input half of the chain-belt transmission 1, it will be obvious to those skilled in the art that analogous noise-damping devices 23 will likewise be provided at the bearings of the conical disks on the output side. The noise-damping devices in the form of a ring-shaped element 24 with a damper insert 25 prevent the body vibrations generated by the impacts of the link-chain 2 entering the pairs of conical disks from being transmitted through the bearings to the adjacent parts of the transmission. As a result, the chain-belt transmission according to the invention has a noticeably lower level of running noise than the chain-belt transmissions of the known state of the art.

Figure 3:
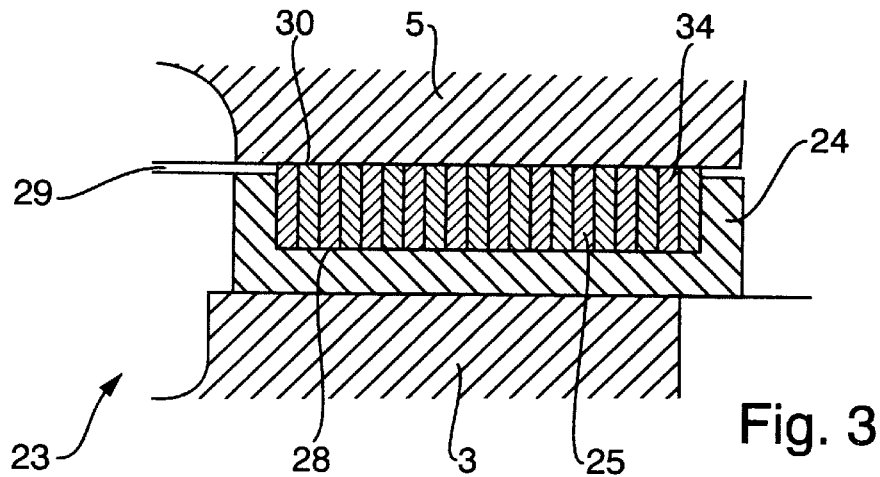
FIG. 3 represents an enlarged sectional view of a ring-shaped element in which a damper insert is arranged in accordance with a second embodiment of the invention.

FIG. 3 represents a noise-damping device 23 in accordance with a second embodiment of the invention. Compared to the first embodiment as shown in FIG. 2, the ring-shaped element 24 of the second embodiment has no inward-angled end portions 27 on the side that faces the seating surface 30 of the conical disk 5. The damper insert 34 of the second embodiment is a laminated damper body 34 composed of sandwiched layers of the materials named above. The individual layers of the laminated damper body 34 are stacked adjoining each other in the axial lengthwise direction of the shaft 3. In this arrangement, it is also possible for the individual layers to consist of different materials in order to obtain an overall level of structural stiffness of the laminated body 34 where the conical disk 5 that is equipped with the noise-damping device 23 will have the same level of stiffness as a conical disk of the known state of the art. Because of the damping properties of the laminated body 34, the conical disk 5 and the shaft 3 are acoustically uncoupled from each other so that the body vibrations introduced into the conical disks by the link chain 2 cannot be transmitted to the shaft 3 and, consequently, the conical disk 5 is acoustically isolated from the adjacent parts of the transmission.

The second embodiment of the noise-damping device 23 that is illustrated in FIG. 3 can also be used at the bearings of the fixed conical disk 4 (see FIG. 1) with the result that the chain-belt transmission 1 according to the invention runs with the desired degree of quietness and thereby contributes to an increased level of comfort.

Figure 4:
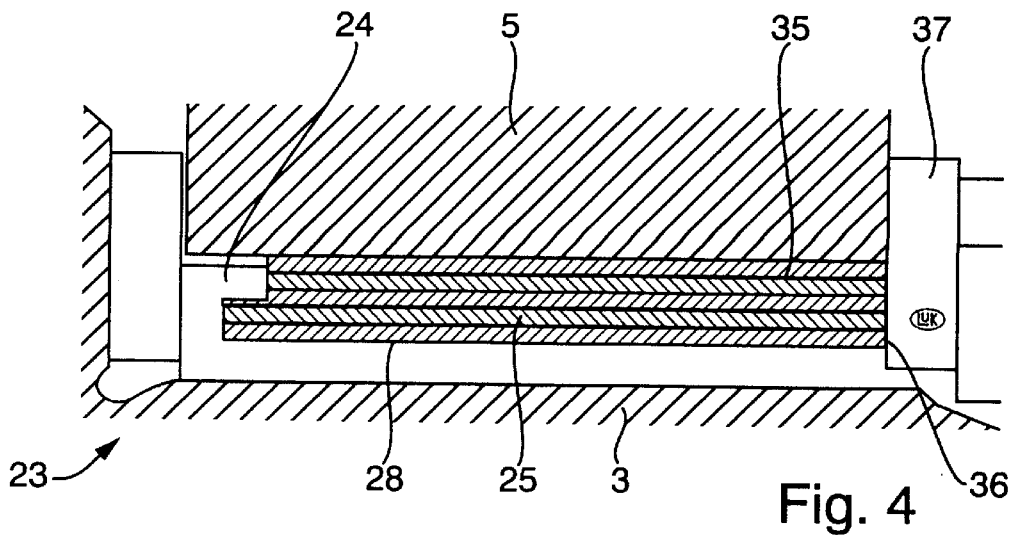
FIG. 4 represents an enlarged sectional view of a ring-shaped element in which a damper insert is arranged in accordance with a third embodiment of the invention.

A third embodiment of the noise-damping device 23 according to the invention, as illustrated in FIG. 4, has a ring-shaped element 24 that is open at one axial end 36 and contains a seating recess 28 for a damper insert in the form of a laminated body 35.

The laminated body 35 of FIG. 4 differs from the laminated body 34 of FIG. 3 in the orientation of the layers. As indicated clearly in FIG. 4, the laminated body 35 has several radially stacked layers of damping materials that are combined into a damper body whose topside supports the seating surface 30 of the conical disk 5. As is readily apparent from the drawing, the noise-damping device 23 according to the third embodiment of the invention can also be arranged in the area of the bearings of the axially fixed conical disk 4 and in the area of the bearings of the shaft 3 of the input half as well as the output half of the chain-belt transmission 1.

The third embodiment of the noise-damping device as shown in FIG. 4 offers the advantage of a simple assembly operation, as the laminated body 35 can be pushed easily from the open end 36 into the seating recess 28 of the ring-shaped element 24. The completed assembly is slid onto its seat on the shaft 3 and secured by a retainer disk 37.

Figure 5:
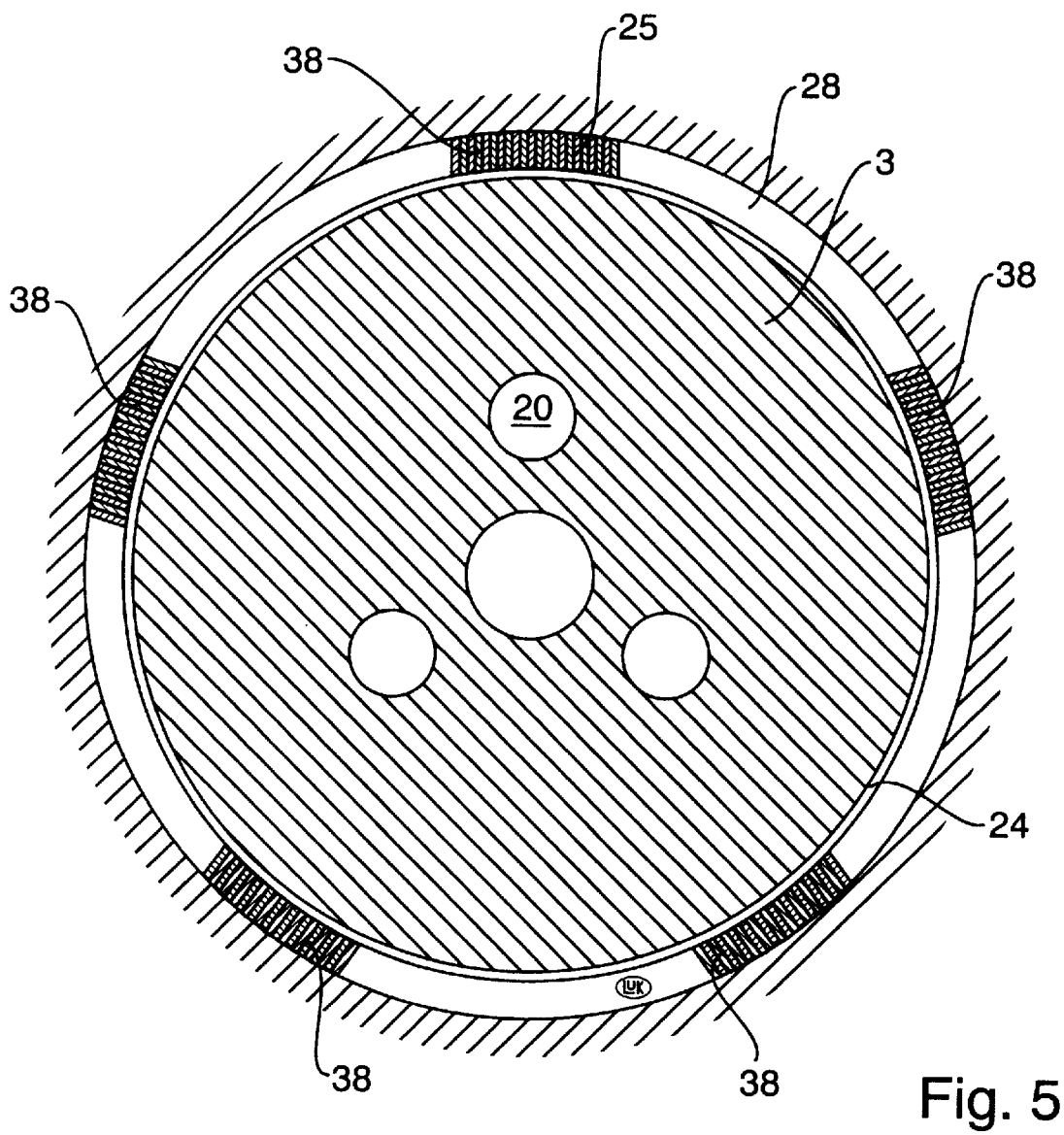
FIG. 5 represents a view of the section that is indicated by A—A in FIG. 1, illustrating a damper insert that is arranged in segment form in the ring-shaped seating recess.

FIG. 5 represents a sectional view along the line A—A of FIG. 1 and serves to illustrate a possible arrangement of the damper insert 25 in the seating recess 28 of the ring-shaped element 24 where the damper insert 25 does not occupy the entire seating recess 28. Rather, the damper insert 25 is provided only in the form of individual segments 38 located at a distance from each other inside the seating recess 28 for the purpose of supporting and acoustically uncoupling the conical disks. As is self-evident, the embodiment of the noise-damping device according to FIG. 5, likewise, can be used at all bearing locations of the conical disks and/or the shafts of the chain-belt transmission 1 according to the invention. The damper insert 25 shown in FIG. 5 is a laminated body composed of several layers of damping materials that are stacked in the circumferential direction at the outside circumference of the shaft 3.

The noise-damping device according to the invention makes it possible to noticeably reduce the running noise of the chain-belt transmission without the need for secondary measures (such as for example the coated housing parts or isolating mats mentioned above at the beginning) in the motor vehicle that is equipped with the chain-belt transmission. In addition, the noise-damping device has the advantage of requiring only a small amount of space and causes no increase in the spatial requirements for the transmission. The noise-damping device can be arranged at all bearing locations of the conical disks and/or shafts of the chain-belt transmission, thereby providing the possibility of an active acoustical uncoupling that obviates the need for secondary noise-reduction measures. As a result of the noise-damping device, the noise produced by the link chain entering the pairs of conical disks can no longer reach the outside of the transmission, while the stiffness of the conical disks is not reduced in comparison to known state-of-the-art conical disks. The noise-damping device is configured as a ring-shaped element with a damper insert in an arrangement where the ring-shaped element provides the spatial constraints to contain the damper insert. The gap height between the ring-shaped element and the conical disks can be adapted to particular requirements, and the ring-shaped element itself can be made, e.g., in a cost-effective sheet-metal design or out of a full material with a subsequent heat treatment, e.g., for the purpose of hardening.

The materials used for the damper insert can be polymeric or rubber materials either in an integral, monolithic form or in a layered configuration. It is also possible to use metals or metal alloys as isolating materials for the damper insert, including foams of any of the aforementioned materials. In order to control the degree of stiffness of the damper insert, it is possible to use different combinations of the aforementioned materials to configure the damper insert as a laminated body.

Thus, the invention provides a continuously variable chain-belt transmission with cone-disk pulleys (pairs of conical disks) both at the torque-input side and at the torque-output side, an endless flexible torque-transmitting device (also referred to as a chain belt) as well as a device for damping audible noise that occurs as a side effect of transmitting a torque through the chain-belt transmission. The noise-damping device is arranged in the area of the bearings of at least one of the conical disks, providing the possibility of reducing the noise generated by the chain belt entering the pairs of conical disks.

Concerning any features of the invention that have not been covered in detail in the foregoing description, express reference is hereby made to the drawing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A continuously variable chain-belt transmission with
    a pair of conical disks at a torque-input side and a pair of conical disks at a torque-output side, the conical disks being supported by bearings, each of the bearings having an inner ring,
    a chain belt for transmitting a torque, and
    a noise-damping device for damping a noise produced by the chain-belt transmission transmitting the torque,
    wherein the noise-damping device is arranged adjacent to at least one of the bearings of at least one of the conical disks, the noise-damping device being arranged on a shaft, and the shaft being supported through the noise-damping device on the inner ring of the at least one of the bearings.

2. The chain-belt transmission of claim 1, wherein the noise-damping device reduces the degree to which sound waves are transmitted through material portions of the transmission from the conical disks to parts that are adjacent to the conical disks.

3. The chain-belt transmission of claim 1, wherein the noise-damping device acoustically isolates the conical disks from parts of the chain-belt transmission that are adjacent to the conical disks.

4. The chain-belt transmission of claim 1, wherein the noise-damping device is arranged both adjacent to the bearings of axially movable conical disks and adjacent to the bearings of axially fixed conical disks.

5. The chain-belt transmission of claim 1, wherein the noise-damping device has the form of a ring-shaped element with a cross-section resembling the letter U, comprising a seating recess for a damper insert.

6. The chain-belt transmission of claim 5, wherein the legs of the cross-section resembling the letter U have end portions angled inwards in relation to the U and reaching at least partially around the damper insert.

7. The chain-belt transmission of claim 1, wherein the noise-damping device has the form of a ring-shaped element with a cross-section resembling the letter U but being open towards one axial direction, comprising a seating recess for a damper insert.

8. The chain-belt transmission of claim 5, wherein the damper insert is configured monolithically of a single piece of material.

9. The chain-belt transmission of claim 5, wherein the damper insert is of a layered type of construction.

10. The chain-belt transmission of claim 5, wherein the damper insert occupies all of the seating recess.

11. The chain-belt transmission of claim 5, wherein the damper insert occupies part of the seating recess.

12. The chain-belt transmission of claim 5, wherein the damper insert comprises at least one of the materials from the group consisting of elastomers, rubbers, and metals, and of foams of elastomers, rubbers and metals.

13. The chain-belt transmission of claim 5, wherein the damper insert protrudes above a top level of the seating recess by a predetermined height gap and a fixed conical disk rests on the damper insert.

14. The chain-belt transmission of claim 5, wherein the damper insert protrudes above a top level of the seating recess by a predetermined height gap and the bearings support a movable conical disk by way of the damper insert.

* * * * *